United States Patent [19]
Heller et al.

[11] Patent Number: 5,589,985
[45] Date of Patent: Dec. 31, 1996

[54] COMPUTER MONITOR HOOD

[76] Inventors: Philip Heller, 216 Coldstream Ave., Toronto, Ontario, Canada, M5N 1Y3; David Heller, 41 Ezrat Tora, Jeruselam, Israel

[21] Appl. No.: 488,908

[22] Filed: Jun. 9, 1995

[51] Int. Cl.$^6$ ........................................... G02B 27/00
[52] U.S. Cl. .................. 359/608; 359/601; 359/612; 348/842
[58] Field of Search ........................... 359/601, 608, 359/609, 611, 612, 610, 809; 348/842, 834

[56] References Cited

U.S. PATENT DOCUMENTS

| | | | |
|---|---|---|---|
| 4,569,572 | 2/1986 | Kopich | 359/601 |
| 4,784,468 | 11/1988 | Tierney | 359/601 |
| 5,101,298 | 3/1992 | Lentz et al. | 359/612 |
| 5,121,253 | 6/1992 | Waintroob | 359/601 |
| 5,233,468 | 8/1993 | McNulty | 359/601 |
| 5,237,453 | 8/1993 | Jones | 359/601 |
| 5,243,463 | 9/1993 | Waintroob | 359/601 |

*Primary Examiner*—Timothy P. Callahan
*Assistant Examiner*—Dinh T. Le
*Attorney, Agent, or Firm*—Donald E. Hewson

[57] ABSTRACT

A computer monitor hood for use in conjunction with a computer monitor having a top surface, left and right side surfaces, and a forwardly facing screen, is disclosed. The computer monitor hood comprises a top shading panel having a front edge, a rear edge, and left and right side edges. Left and right side shading panels are operatively attached to the top shading panel and are disposed in generally vertically oriented relation to the left and right side edges of the top shading panel, respectively. The left and right side shading panels each have front, rear, and bottom edges. A front-to-rear main axis extends from the front edges to the rear edges of the shading panels. When the computer monitor hood is in place on a computer monitor, the top, left and right shading panels each project forwardly from the front of the computer monitor, at the respective of the top, left side, and right side surfaces of the computer monitor, so as to shade the screen of the computer monitor. A counterweight is operatively mounted in selectively movable relation on the computer monitor hood in any one of a plurality of front-to-rear positions so as to permit the counterweight to balance the computer monitor hood at a selected position on the computer monitor. Typically, at this selected position, the computer monitor hood is positioned as far forwardly as reasonably possible and is tilted downwardly, as balanced by the counterweight, so as to provide maximum shading for the screen of the computer monitor.

13 Claims, 5 Drawing Sheets

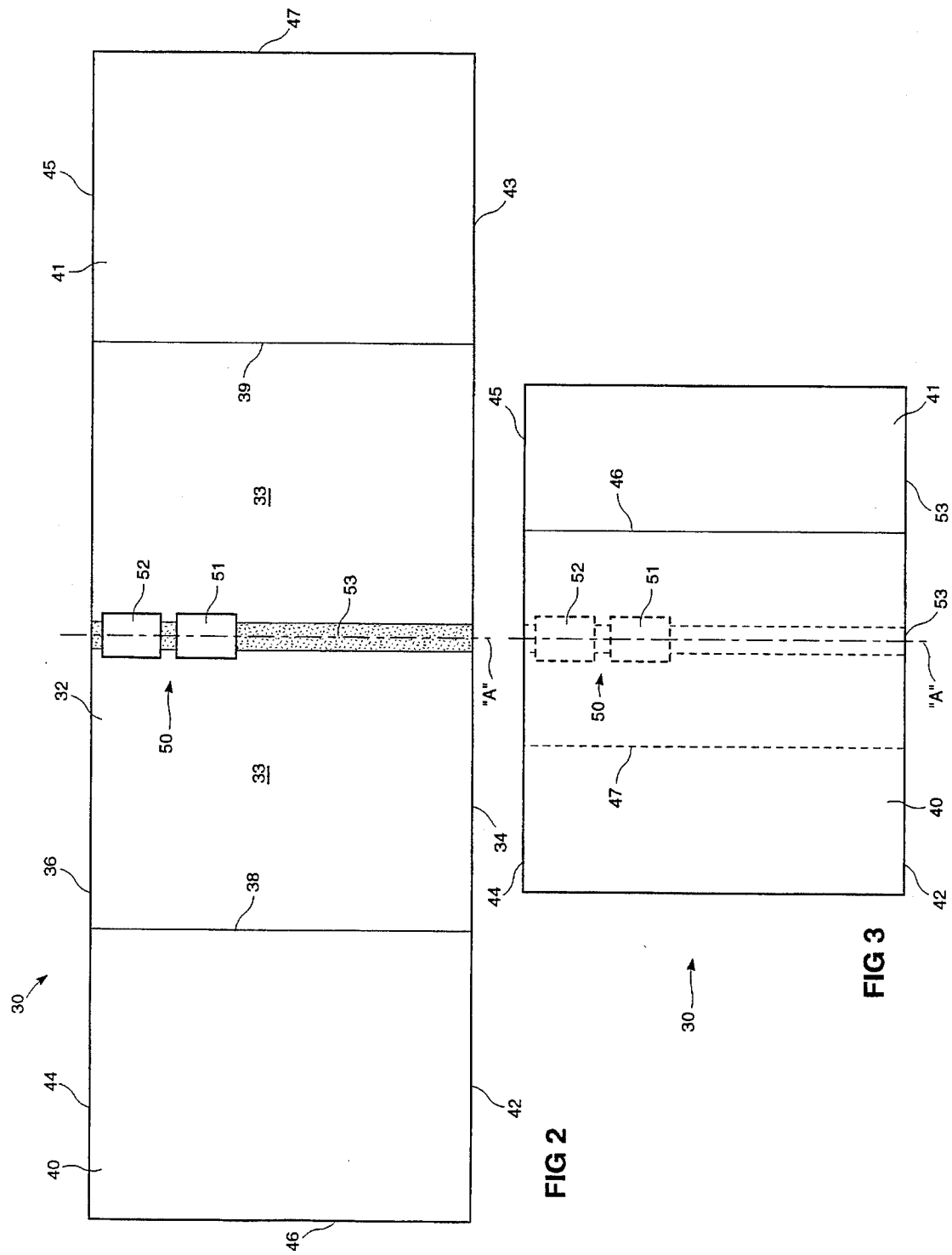

COMPUTER MONITOR HOOD

FIELD OF THE INVENTION

This invention relates to computer monitor hoods for shading the screen of a computer monitor from ambient light. More particularly, this invention relates to computer monitor hoods which are not attached or fixed to the monitor; but whose placement and balance, when in place on a computer monitor, can be adjusted.

BACKGROUND OF THE INVENTION

It is common in offices, and other environments where computers are used, to have reasonably intense light from overhead lighting fixtures and windows, in order to sufficiently illuminate an office. Due to the intensity of this light, and also due to the location of overhead lighting fixtures and windows, the light is often perceived as glare on a computer monitor screen. This glare can make it difficult, if not impossible, to see the computer monitor screen properly. It is, therefore, necessary to preclude as much of this light as possible from reaching the computer monitor screen in such a manner that it is reflected off the screen as glare.

In many instances, it may be possible to close curtains or blinds over a window in order to block much of the glare-causing emanating from a window; however, this reduces the amount of ambient light in the room, which might be unacceptable. It is generally not possible to block out the light from overhead lighting fixtures, but it is possible to turn off the overhead lights. However, even this step is often unacceptable.

DESCRIPTION OF THE PRIOR ART

U.S. Pat. No. 5,121,253 to WAINTROOB discloses a visor for a computer monitor wherein the visor has a left wall, a right wall, and a top wall, and the visor is attached to a computer monitor by means of VELCRO™, or other hook and loop two-part fastening devices, which is highly disadvantageous, as it requires permanent attachment of one portion of the VELCRO™ to the computer monitor. The position of the visor on a computer monitor is only very slightly adjustable, depending on the width of the VELCRO™, or on the amount of VELCRO™ used, which is also disadvantageous, since it is necessary to be able to adjust a visor in order to properly shield the computer monitor screen from glare. It is also important to be able to permit proper placement on a variety of computer monitors, which is not readily achievable by WAINTROOB. Particularly, it is highly desirable to be able to angularly adjust the visor by tilting the visor downwardly at its front such that the front edge of the visor is lower than the top edge of the computer monitor. Such angular adjustment of the visor is not taught in the WAINTROOB patent.

U.S. Pat. No. 5,243,463, also to WAINTROOB, is a Continuation-In-Part of the earlier patent, having all of the same disadvantageous features.

U.S. Pat. No. 5,233,468 to MCNULTY discloses a computer hood that also has a left wall, a right wall, and a top wall. This computer hood attaches to a computer monitor by means of a retaining device in the form of a pair of clips extends outwardly at right angles to each of the left and right side walls at the bottom thereof, such that each clip engages a lower front portion of the front of the monitor. Additionally, a back wall catches a rear-facing surface of the monitor, so as to keep the visor in place. The position of the visor on a computer monitor, including the angular orientation, is not adjustable in terms of position, which is greatly disadvantageous, as discussed above.

U.S. Pat. No. 5,237,453 to JONES discloses a light absorbing visor for video display monitors, wherein a thin flexible sheet of plastic such as polyvinylchloride is curved and otherwise shaped to conform to the two sides and top of a computer monitor. The visor is secured to the monitor by means of an adhesive strip on the visor, or alternatively by VELCRO™, and is therefore not adjustable in terms of positioning. It is not taught in the JONES patent to angularly adjust the visor on the monitor.

OBJECTS OF THE INVENTION

It is an object of the present invention to provide a computer monitor hood that is placeable on a computer monitor without being attached to the computer monitor.

It is another object of the present invention to provide a computer monitor hood that is readily adjustable in terms of fore-aft and angular placement on a computer monitor.

SUMMARY OF THE INVENTION

In accordance with one aspect of the present invention, there is provided a computer monitor hood for use in conjunction with a computer monitor having a top surface, left and right side surfaces, and a forwardly facing screen. The computer monitor hood comprises a top shading panel having a front edge, a rear edge, and left and right side edges. Left and right side shading panels are operatively attached to the top shading panel and are disposed in generally vertically oriented relation to the left and right side edges of the top shading panel, respectively. The left and right side shading panels each have front, rear, and bottom edges. A front-to-rear main axis extends from the front edges to the rear edges of the shading panels. When the computer monitor hood is in place on a computer monitor, the top, left and right shading panels each project forwardly from the front of the computer monitor, at the respective of the top, left side, and right side surfaces of the computer monitor, so as to shade the screen of the computer monitor. A counterweight is operatively mounted in selectively movable relation on the computer monitor hood in any one of a plurality of front-to-rear positions so as to permit the counterweight to balance the computer monitor hood at a selected position on the computer monitor. Typically, at this selected position, the computer monitor hood is positioned as far forwardly as reasonably possible and is tilted downwardly, as balanced by the counterweight, so as to provide maximum shading for the screen of the computer monitor.

BRIEF DESCRIPTION OF THE DRAWINGS

Embodiments of this invention will now be described by way of example in association with the accompanying drawings in which:

FIG. 2 is a top plan view of the computer monitor hood of FIG. 1 in a flat, open configuration;

FIG. 3 is a top plan view of the computer monitor of FIG. 1 in a folded configuration, adapted for storage or transport;

DETAILED DESCRIPTION OF THE PREFERRED EMBODIMENT

Figure 1:
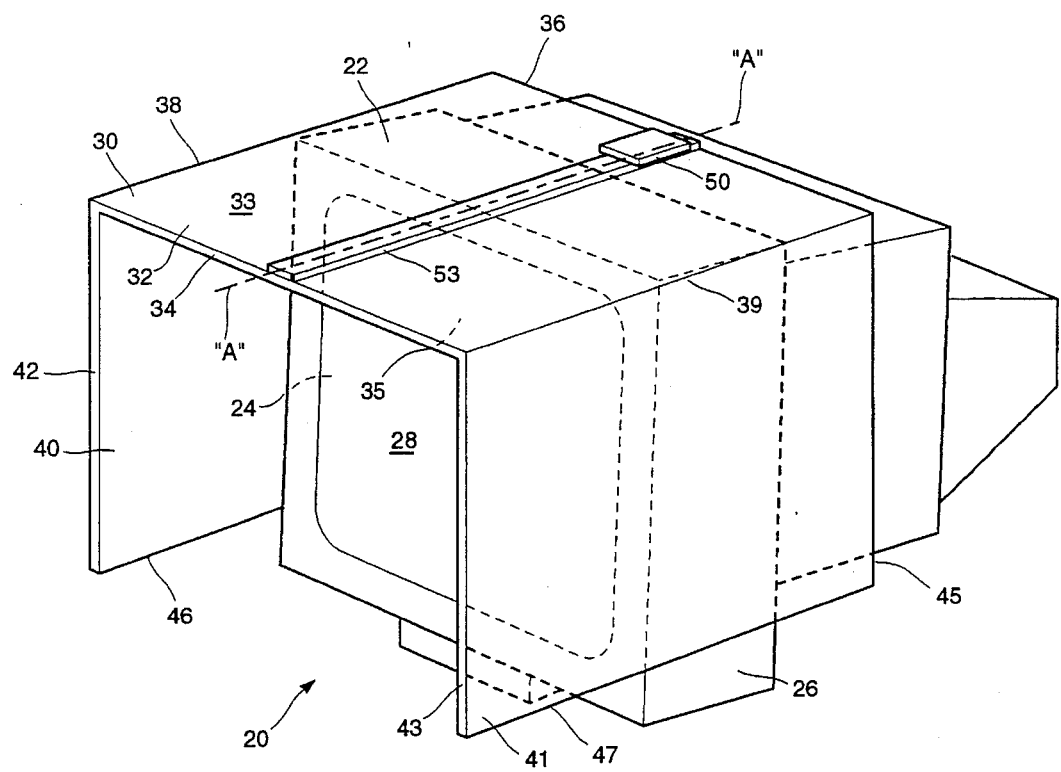
FIG. 1 is a perspective view of a preferred embodiment of the computer monitor hood of the present invention in place on a computer monitor.

Reference will now be made to FIGS. 1 through 5, which show the preferred embodiment computer monitor hood 30 of the present invention in place on a computer monitor 20 having a top surface 22, a left side surface 24, a right side surface 26, and a forwardly facing screen 28.

The computer monitor hood 30 comprises a substantially planar top shading panel 32, having a front edge 34, a rear edge 36, and left and right side edges 38, 39. In the preferred embodiment, the left side edge 38 and the right side edge 39 of the top shading panel 32 are parallel one with the other. The top shading panel 32 should be wide enough to span across the width of convention 15" monitors. Further, the rear portion of the top shading panel 32 may include a screened or perforated portion to permit heat vented from the rear portion of the monitor to pass therethrough. Alternatively, a short spur depending from the top shading panel may be included to prevent the computer monitor hood 30 from becoming angled downwardly at the back when the computer monitor hood 30 is not in use and is pushed toward the rear of the computer monitor 20.

The substantially planar left and right side shading panels 40 and 41 are affixed to the top shading panel 32 so as to depend from the left and right edges 38, 39 thereof, respectively. Preferably, the left and right side shading panels 40 and 41 are disposed in generally vertically oriented relation to the top shading panel 32, so as to be juxtaposed to the respective of the left and right side surfaces 24 and 26 of the computer monitor 20. The left side shading panel 40 has a front edge 42, a rear edge 44, and bottom edge 46. Similarly, the right side shading panel 41 has a front edge 43, a rear edge 45, and a bottom edge 47. Preferably, the front edges 34, 42, and 43 of the left and right side shading panels 40 and 41 and the top shading panel 32 are co-planar one with the other.

The computer monitor hood 30 has a front-to-rear main axis "A" oriented in generally parallel relation to the parallel left and right side edges 38 and 39 of the top shading panel.

It is preferable to have a computer monitor hood that may be placed on, or is generally supported by, the computer monitor, without permanent attachment to the computer monitor, and also that is adjustable to fit a variety of computer monitors and also that is adjustable in terms of placement on a computer monitor to provide a suitable amount of shading of the forwardly facing screen of the computer monitor, depending on the position of the overhead lighting.

Figure 4:
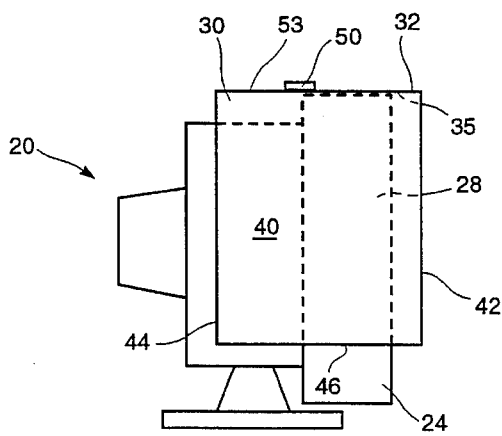
FIG. 4 is a side elevational view of the computer monitor hood of FIG. 1 in place on a computer monitor, with the computer monitor hood projecting slightly outwardly from the front of the computer monitor.
Figure 5:
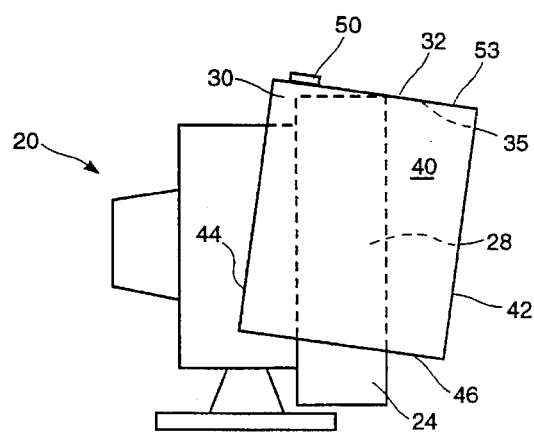
FIG. 5 is a side elevational view of the computer monitor hood of FIG. 1 in place on a computer monitor, with the computer monitor hood projecting significantly outwardly from the front of the computer monitor and angled slightly downwardly.

In the preferred embodiment, in order to provide such a computer monitor hood 30, a counterweight 50 is operatively mounted in selectively movable relation on the computer monitor hood 30 in any one of a plurality of front-to-rear positions, so as to permit the counterweight 50 to balance the computer monitor hood 30 on the computer monitor 20. Proper balancing of the computer monitor hood 30 is important as the computer monitor hood 30 must extend forwardly from the front of the computer monitor 20 so as to shade the forwardly facing screen 28 of the computer monitor 20, which forward extension tends to cause a forward imbalance of the computer monitor hood 30. It is also highly desirable to have the front edge 34 of the top shading panel 32 situated so as to be generally in visual alignment with the top of the screen 28 of the computer monitor 20. In this manner, the computer monitor hood 30 provides as much shading as possible for the screen 28. The computer monitor hood 30 is placeable on the computer monitor 20 in angularly adjustable relation so as to permit the front edge 34 to be generally aligned with the top of the screen 28. Such alignment will, of course, be dependent on the specific user sitting in front of the computer monitor 20. The computer monitor hood 30 must therefore be attached or supported in some stable manner, such that it will remain in place during use, when the computer monitor hood 30 is placed slightly forwardly on a computer monitor 20, as shown in FIG. 4, and also when placed more forwardly on a computer monitor 20, as shown in FIG. 5.

In the preferred embodiment, the counterweight is operatively mounted on the computer monitor hood 30 on a receiving portion 31 by means of a hook and loop fastener system, such as VELCRO™. In a hook and loop fastener system, each of the hooks removably engages an opposed one of the loops, as is well known. An elongate strip 53 of one component of the hook and loop fastener is disposed on the computer monitor hood 30, thus defining the receiving portion 31 preferably generally centrally located on the top surface 33 of the top shading panel 32 so as to be oriented in a direction generally parallel to the front-to-rear main axis "A". The counterweight 50 would, accordingly, have the other co-operating component of the hook and loop fastener system disposed thereon. In this manner, the counterweight 50 is readily selectively movable to any one of a plurality of front to rear positions on the top shading panel 32, along the elongate strip 53 of fastening material, thus permitting the computer monitor hood 30 to be balanced at a selected position on the computer monitor 20. Typically, at this selected position, the computer monitor hood 30 is positioned as far forwardly as reasonably possible and is tilted downwardly at the front such the front edge 34 thereof is generally aligned with the top of the screen 28, so as to shade the screen 28 of the computer monitor 20 as much as possible, as balanced by the counterweight 50.

In order to help retain the computer monitor hood 30 in place on the computer monitor 20, it is preferable to have the bottom surface 35 of the top shading panel 32 be of a soft, high friction material, such as sponge rubber or the like.

As can be seen in FIGS. 2 and 3, the left side shading panel 40 and the right side shading panel 41 are foldable outwardly so as to make the computer monitor hood 30 flat, and are then foldable over the top shading panel 32 so as to provide a folded configuration wherein the computer monitor hood 30 is adapted for storage or transport.

Figure 6:
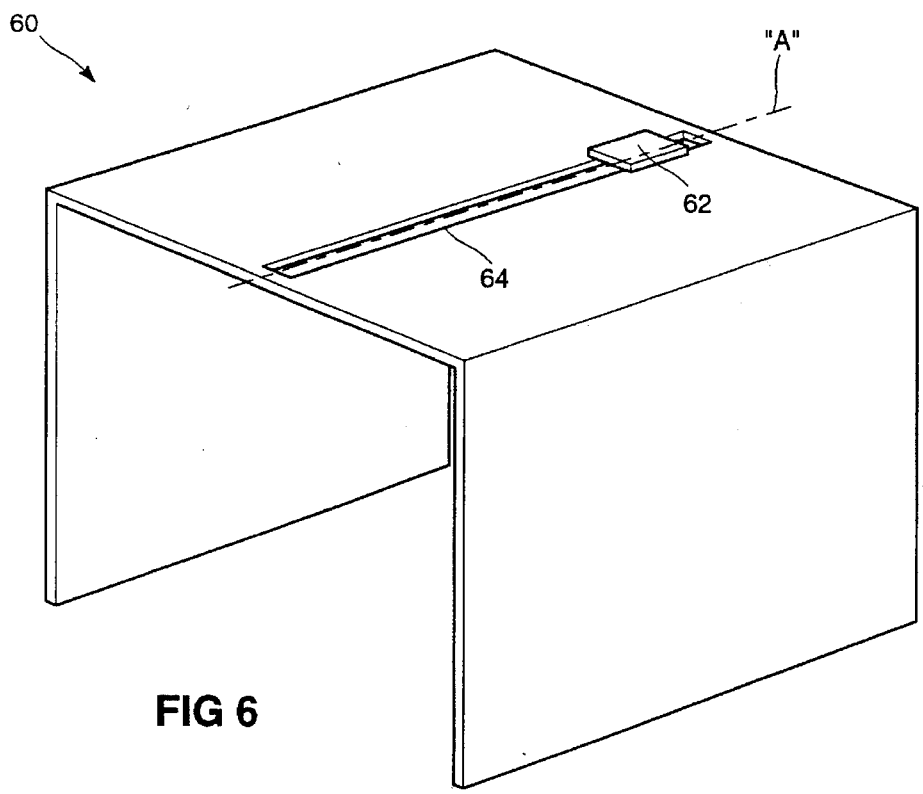
FIG. 6 is a perspective view of an alternative embodiment computer monitor hood.

In an alternative embodiment, as is depicted in FIG. 6, it is contemplated that the counterweight 62 could be operatively mounted for slidable movement within an elongate track 64, which elongate track is generally parallel to the main axis "A" of the computer monitor hood 60.

Figure 7:
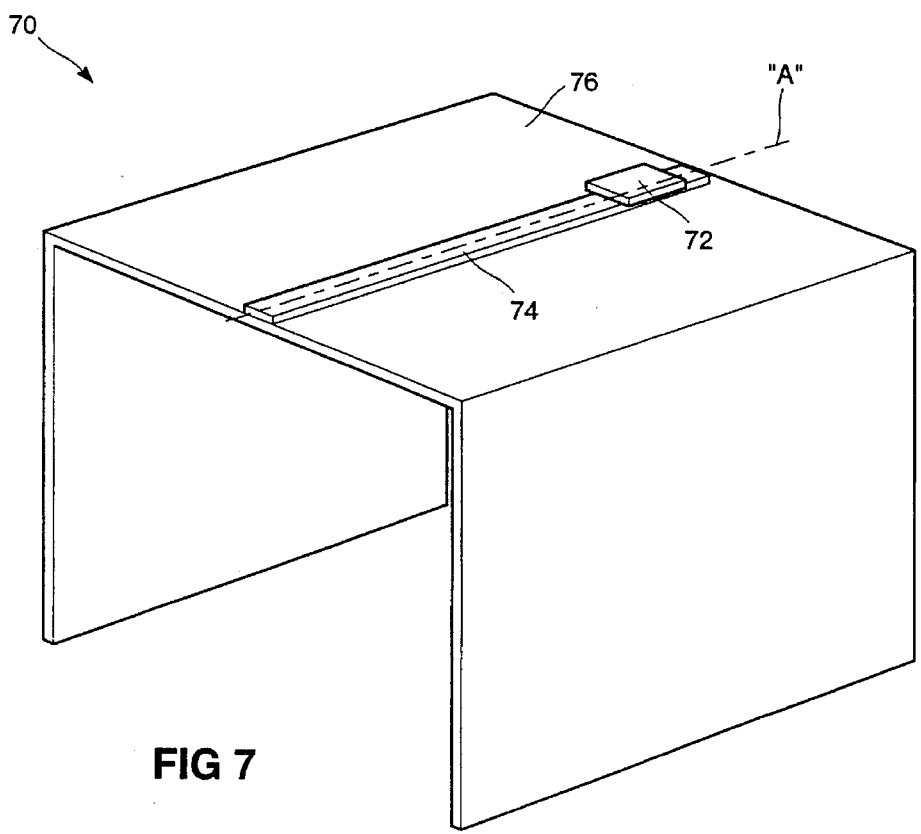
FIG. 7 is a perspective view of another alternative embodiment computer monitor hood.

In a further alternative embodiment, as depicted in FIG. 7, it is contemplated that the counterweight 72 could be operatively mounted by magnetic mounting means. That is to say that an elongate metal strip 74 could be mounted on or in the top shading panel 76 of the computer monitor hood 70, preferably generally centrally located thereon in an orientation parallel to the front-to-rear main axis "A", and a magnetic counterweight 72 (or counterweights) could be placed thereon.

Figure 8:
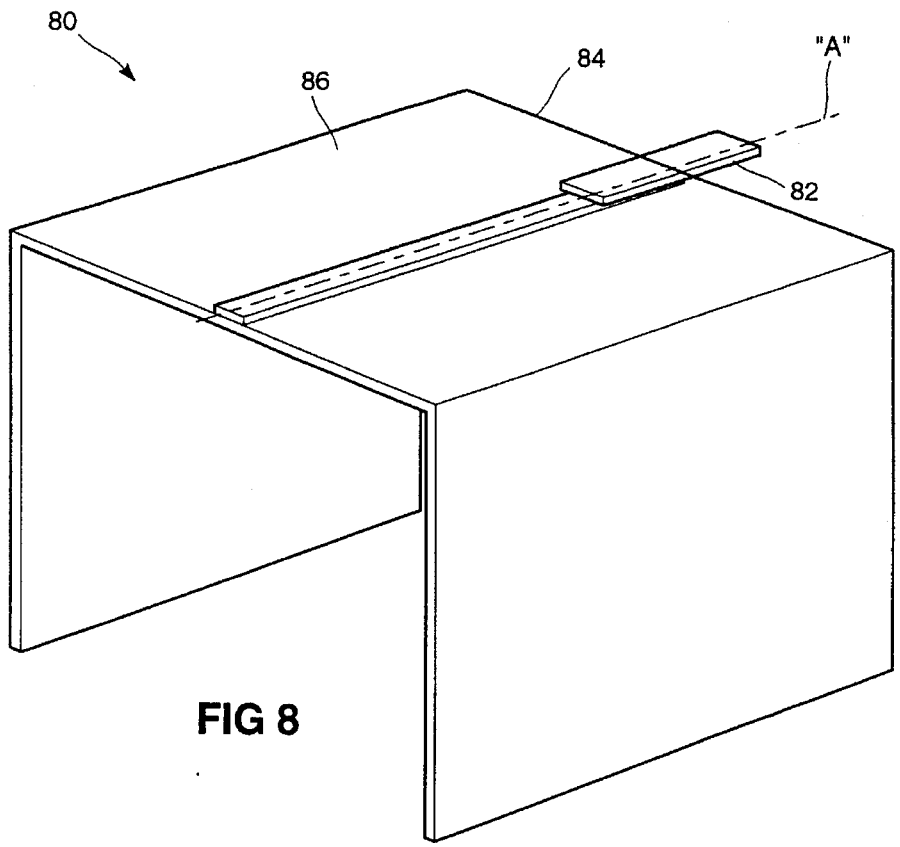
FIG. 8 is a perspective view of another alternative embodiment computer monitor hood.

In a further alternative embodiment, as depicted in FIG. 8, it is contemplated that the computer monitor hood 80 could comprise a top shading panel 82 having a high friction top surface 84. A suitable material for the top surface 84 would include felt and the like. The counterweight 86 comprises a pliable high friction fabric material outer shell 88 retaining therein an amount of fragmentary material 89, such as dried beans, shot, sand, and so on. The counterweight 86 may be placed essentially anywhere on the top shading panel 82 in order to properly balance the computer monitor hood 80 on a computer monitor, with the high friction top surface 84 retaining the counterweight 86 in substantially non-moving relation. There is no need to use a hook and loop fastener system, or the like, to secure the counterweight 86 in place; thus, as can be seen in FIG. 8, there is no elongate strip of one component of the hook and loop fastener system disposed on the computer monitor hood 80.

Figure 9:
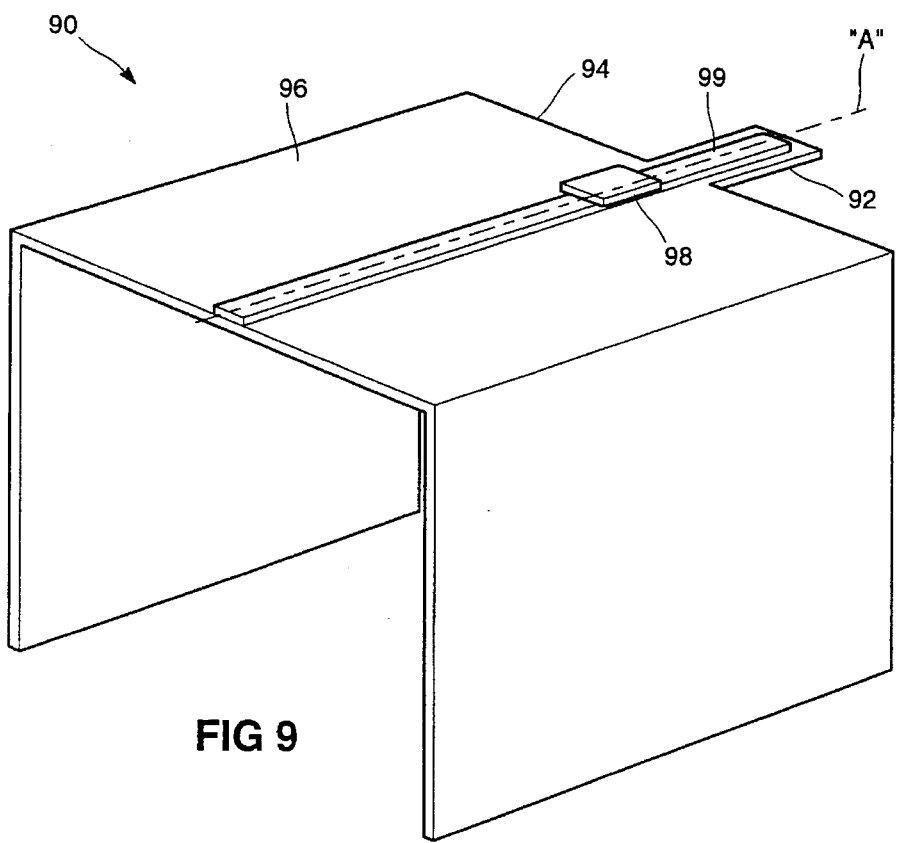
FIG. 9 is a perspective view of another alternative embodiment computer monitor hood.

In yet another alternative embodiment, as depicted in FIG. 9, it is contemplated that a counterweight receiving extension portion 92 extending rearwardly from the rear edge 94 of the top shading panel 96 of the computer monitor hood 90, could be included. The extension portion 92 would be constructed and otherwise adapted to receive the counterweight 98 in selectively movable relation thereon. As depicted, the elongate strip 99 of the one component of the hook and loop fastening system on the top shading panel 96 of the computer monitor hood 90 extends onto the counterweight receiving extension portion 92.

Figure 10:
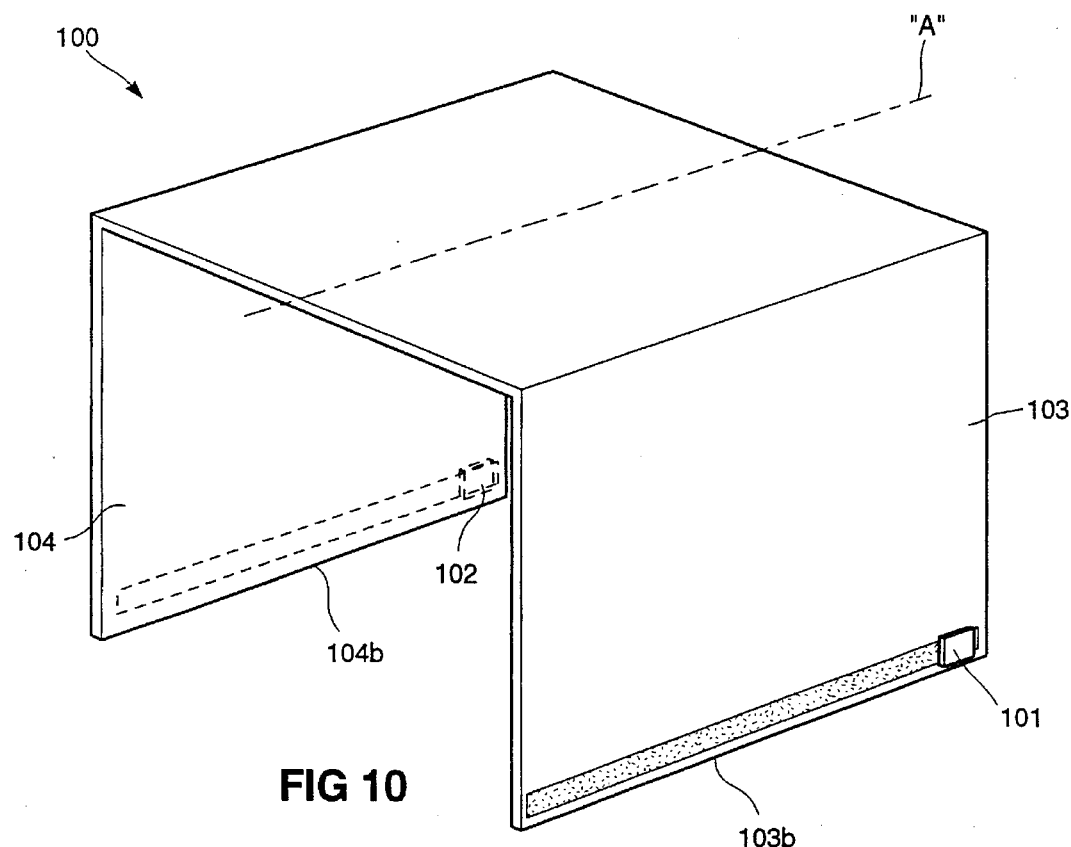
FIG. 10 is a perspective view of yet another alternative embodiment computer monitor hood.

In yet another alternative embodiment, as depicted in FIG. 10, it is contemplated that the computer monitor hood 100 of the present invention could comprise a first counterweight 101 operatively mounted in selectively movable relation on the right side shading panel 103, and a second counterweight 102 operatively mounted in selectively movable relation on the left side shading panel 104, in any one of a plurality of front-to-rear positions, so as to permit the first and second counterweights to co-operatingly balance the computer monitor hood 100 on a computer monitor. Preferably, the first counterweight 101 is operatively mounted on the right side shading panel 103 along the bottom edge 103b thereof, and the second counterweight 102 is operatively mounted on the left side shading panel 104 along the bottom edge 104b thereof, when the computer monitor hood is in place on a computer monitor. In this manner, the first and second counterweights 101 and 102 are disposed below the centre of gravity and also below any point of supporting contact of the computer monitor hood 100 on a monitor, which points of supporting contact are potentially pivot points of the computer monitor hood 100. Accordingly, the computer monitor hood 100 tends to be stable when in place on a computer monitor. A further advantage of mounting the first and second counterweights 101 and 102 along the bottom edge of the left and right side shading panels 103 and 104 is that the centre of gravity of the computer monitor hood 100 is lower than if the first and second counterweights 101 and 102 were mounted on top of the computer monitor hood 100. This may further promote stable placement of the computer monitor hood 100 on a computer monitor.

Figure 11:
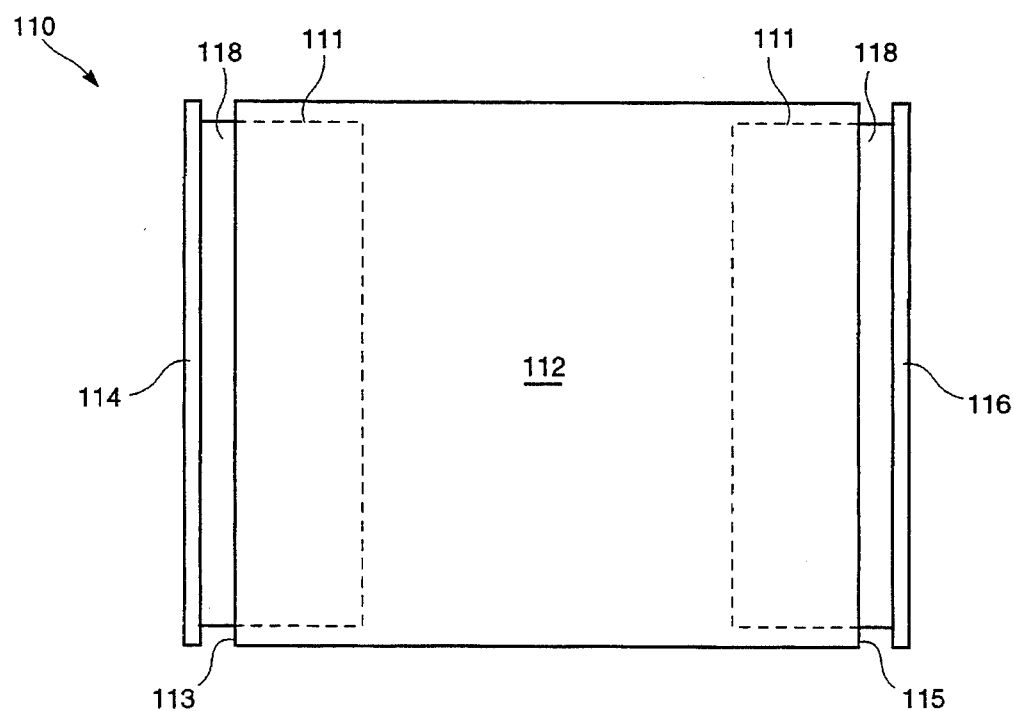
FIG. 11 is a perspective view of a further alternative embodiment computer monitor hood.

In yet another alternative embodiment, as depicted in FIG. 11, it is contemplated that the computer monitor hood 110 comprises top shading panel 112, and laterally adjustable left and right shading panels 114 and 116. The left and right shading panels 114 and 116 each have a tongue portion 118 that is shaped and dimensioned to slidably engage a respective co-operating notch 111 in each side 113 and 115 of the top shading panel 112. In this manner, the effective width of the computer monitor hood 110 is adjustable so as to permit the computer monitor hood 110 to properly fit several different sizes of computer monitors.

In another alternative embodiment, it is contemplated that the top shading panel has a series of slots, or similar openings, disposed adjacent each side edge of the top shading panel. The left and right shading panels are removably insertable into these slots, thus permitting the effective width of the computer monitor hood to be selected, as desired.

In a further alternative embodiment, it is contemplated that the counterweight could be decorative in nature, so as to permit aesthetic enhancement and personalizing of the computer monitor hood of the present invention.

Other modifications and alterations may be used in the design and manufacture of the apparatus of the present invention without departing from the spirit and scope of the accompanying claims.

What is claimed is:

1. A computer monitor hood for use in conjunction with a computer monitor having a top surface, left and right side surfaces, and a forwardly facing screen, said computer monitor hood comprising:

a top shading panel having a front edge, a rear edge, and left and right side edges;

left and right side shading panels operatively attached to said top shading panel and disposed in generally vertically oriented relation to said left and right side edges of said top shading panel, respectively, left and right side shading panels each having front, rear, and bottom edges;

a front-to-rear main axis; and at least one counterweight of weight to balance said computer monitor hood, mounted on a receiving portion of said computer monitor hood in selectively manually movable relation among any one of a plurality of front-to-rear positions so as to permit said counterweight to balance said computer monitor hood at a selected position on the computer monitor;

wherein said counterweight is operatively mounted on said top surface of said computer hood by means of a hook loop fastener system comprising an elongate strip of one component of said hook and loop fastener system disposed on said computer monitor hood and extending generally parallel to said main axis of said computer monitor hood, with the other component of said hook and loop fastener system disposed on said counterweight; and wherein, when said computer monitor hood is in place on a computer monitor, said top, left and right shading panels each project forwardly from the front of the computer monitor, at the respective of the top, left side, and right side surfaces of the computer monitor, so as to shade the screen of the computer monitor.

2. The computer monitor hood of claim 1, wherein said left and right side shading panels are affixed to said top shading panel so as to depend from the left and right side edges thereof, respectively.

3. The computer monitor hood of claim 2, wherein said left side shading panel and said right side shading panel are foldably movable with respect to said top shading panel.

4. The computer monitor hood of claim 3, wherein said left side and said right side edge of said top shading panel are parallel one with the other.

5. The computer monitor hood of claim 1, wherein the front edges of each of said top shading panel, said left side shading panel, and said right side shading panel are coplanar one front edge with the other.

6. The computer monitor hood of claim 5, wherein said top shading panel, said left side shading panel, and said right side shading panel are each substantially planar.

7. The computer monitor hood claim 1, wherein said counterweight is operatively mounted for slidable movement within an elongate track, which elongate track is generally parallel to said main axis.

8. The computer monitor hood of claim 1, wherein said counterweight is elongate, thereby to be selectively positionable so as to extend beyond the rear of said computer monitor hood, thus extending the effective range of said counterweight along said main axis.

9. The computer monitor hood of claim 1, further comprising a counterweight receiving extension portion extending rearwardly from the rear of said computer monitor hood, with said extension portion being constructed to receive said counterweight in selectively moveable relation thereon.

10. The computer monitor hood of claim 1, wherein said left and right shading panels each comprise a tongue portion shaped and dimensioned to slidably engage a respective co-operating notch in each side of said top shading panel.

11. The computer monitor hood of claim 1, wherein said top shading panel comprises a high friction top surface and said counterweight comprises a pliable high friction outer shell retaining therein an amount of fragmentary material.

12. A computer monitor hood for use in conjunction with a computer monitor having a top surface, left and right side surfaces, and a forwardly facing screen, said computer monitor hood comprising;

a top shading panel having a front edge, a rear edge, and left and right side edges;

left and right side shading panels operatively attached to said top shading panel and disposed in generally vertically oriented relation to said left and right side edges of said top shading panel, respectively, left and right side shading panels each having front, rear, and bottom edges;

a front-to-rear main axis; and two counterweights of weight to balance said computer monitor hood, each counterweight mounted on a receiving portion of said computer monitor hood in selectively manually movable relation among any one of a plurality of front-to-rear positions so as to permit said counterweights to balance said computer monitor hood a selected position on the computer monitor;

wherein one of said two counterweights is operatively mounted on said left side shading panel of said computer monitor hood and the other one of said two counterweights is operatively mounted on said right side shading panel of said computer monitor hood, each of said counterweights being mounted by means of a hook and loop fastener system comprising an elongate strip of one component of said hook and loop fastener system disposed on said computer monitor hood and extending generally parallel to said main axis of said computer monitor hood, with the other component of said hook and loop fastener-system disposed on said counterweight; and wherein, when said computer monitor hood is in place on a computer monitor, said top, left and right shading panels each project forwardly from the front of the computer monitor, at the respective of the top, left side, and right side surfaces of the computer monitor, so as to shade the screen of the computer monitor.

13. The computer monitor hood of claim 12, wherein said first counterweight is mounted along the left edge of said left side shading panel and said second counterweight is mounted along the right edge of said right side shading panel, so as to be disposed near the bottom of said computer monitor hood, when said computer monitor hood is in place on a computer monitor.

* * * * *